Patented Mar. 29, 1932

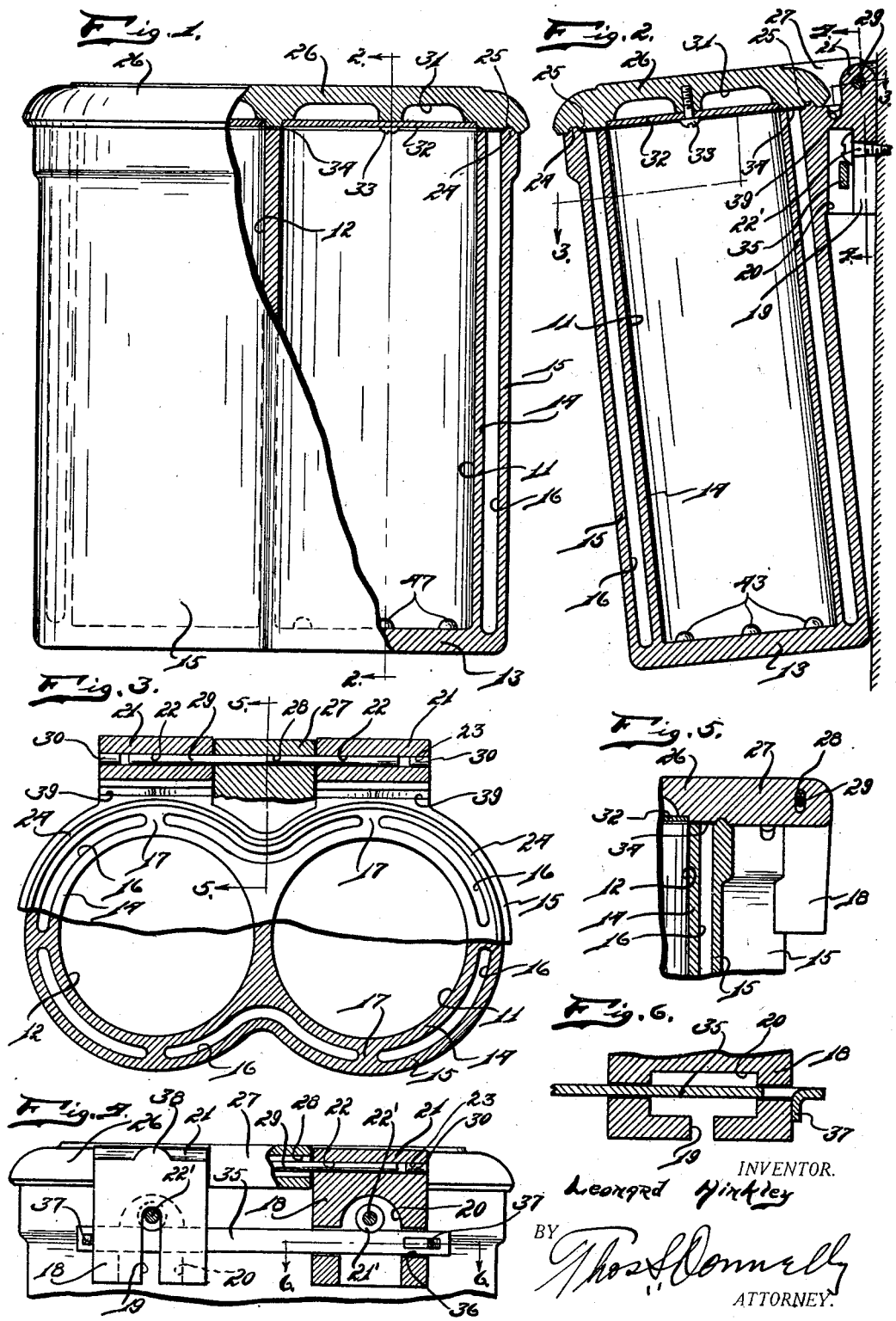
March 29, 1932.  L. HINKLEY  1,851,512
MILK BOTTLE CONTAINER
Filed Nov. 4, 1929

1,851,512

UNITED STATES PATENT OFFICE

LEONARD HINKLEY, OF ADRIAN, MICHIGAN

MILK BOTTLE CONTAINER

Application filed November 4, 1929. Serial No. 404,569

My invention relates to a new and useful improvement in a milk container and has for its object the provision of a container particularly adapted for the reception of milk bottles and is so arranged and constructed that the contents of the bottle may be maintained while in the container at substantially the temperature at which the contents were placed in the container.

It is another object of the present invention to provide a bottle container having a swingably mounted lid adapted to serve as a closure for the open end of the air space surrounding the container.

Another object of the invention is the provision of means for mounting on the container a swingably mounted lid so as to serve as a closure for the open ends of the compartments and as a sealing for the air space and the cavities.

Another object of the invention is the provision of means for limiting the swinging of the cover beyond a predetermined distance.

Another object of the invention is a provision in a milk bottle container of means projecting upwardly from the bottom of the container for retaining the bottle in spaced relation to the bottom.

Other objects will appear hereinafter.

The invention consists in the combination and arrangement of parts hereinafter described and claimed.

The invention will be best understood by a reference to the accompanying drawings which form a part of this specification, and in which, Fig. 1 is a front elevational view of the invention with parts broken away and parts shown in section.

Fig. 2 is a sectional view taken on line 2—2 of Fig. 1.

Fig. 3 is a sectional view taken on line 3—3 of Fig. 2.

Fig. 4 is a fragmentary rear elevational view with parts broken away, taken on substantially line 4—4 of Fig. 2.

Fig. 5 is a fragmentary sectional view taken on line 5—5 of Fig. 3.

Fig. 6 is a fragmentary sectional view taken on line 6—6 of Fig. 4.

The invention is preferably formed from a single casting and comprises a pair of compartments 11 and 12 each having a bottom 13 and each of these compartments being adapted for the reception of a bottle.

As shown in Fig. 2 the compartments are double-walled, the inner wall 14 being spaced from the outer wall 15 to provide an air space 16 which will serve as insulation. Connecting ribs 17 serve to join the inner walls 14 and 15 at spaced intervals. Projecting rearwardly from the container at opposite sides are bosses 18 each having a vertically extending slot 19 formed therein communicating with a hollowed-out space 20 in which may engage the head 21' of a nail or screw 22' which will serve to support the device detachably on the side of a building or other suitable support. Forming an upwardly directed extension on the bosses 18 is a knuckle forming portion 21 having a passage 22 formed therein.

Projecting upwardly from the upper end of the outer wall 15 is a rib 24 engageable in a groove 25 formed in the under surface of the cover 26 which is swingably mounted. Projecting rearwardly from the cover 26 is a tongue 27 having a passage 28 formed therein to provide a knuckle for swingable mounting. A pintle 29, preferably made from wood, is projected into the passages 22 and through the passage 28. As shown in Fig. 5 the passage 28 is vertically elongated so that the cover may fit flat on the upper end of the container at all times. This permits the mounting of the cover in sealing condition and yet at the same time renders it unnecessary that close machining be done.

Corks 30 are projected into the ends 23 of the passages 22 and serve as a sealing means for the ends of these passages so as to prevent undue removal of the pintle 29 therefrom. The under-surface of the cover is hollowed out as at 31 to provide a space for the reception of insulation and a retaining plate 32 is secured to the cover 26 by the screw 33. A gasket 34 is positioned between the cover and the upper edge of the container and serves to seal the compartments 11 and 12 and at the same time seal the air space 16.

After the container has been mounted in position, its removal from the screws or supporting means is prevented by projecting the lock bar 35 through the opening 36 formed in the bosses 18 so that the angularly turned tongue 37 will engage the side face of the boss and prevent its removal until the same has been again straightened which would necessitate the use of a special tool.

Abutment bosses or projections 38 are formed on the knuckles 21 and serve to engage the rear edge of the cover 26 so as to prevent its rearward swinging beyond a predetermined distance and thus eliminating breakage and damage.

With a bottle container of this nature an insulating of the bottle is effected so that the contents thereof may be maintained at a uniform temperature, the receptacle being particularly adapted for use as a milk bottle container.

Formed on the upper surface of each of the bosses 18 is a drain groove 39 which inclines downwardly toward the outer side of the boss so as to prevent passage of water to the compartments 11 and 12.

Projecting upwardly from the bottom 13 are projections or bosses 47 which serve to retain the bottle in elevated relation to the bottom so as to provide a space between the bottom of the bottle container and the bottle itself thus insulating the bottle against conduction of heat.

While I have illustrated and described the preferred form of my invention, I do not wish to limit myself to the precise details of structure shown, but desire to avail myself of such variations and modifications as may come within the scope of the appended claims.

Having thus described my invention what I claim as new and desire to secure by Letters Patent is:

1. A milk bottle container of the class described comprising: a pair of non-communicating bottle receiving compartments open at one end; a pair of spaced walls embracing said compartments; a boss projecting from the rear side of each of said compartments; a knuckle formed on the upper end of each of said bosses; a cover for said compartments mounted between said knuckles and adapted for closing said compartments and for closing the space between said walls; an abutment boss projecting outwardly from each of said bosses for serving as a stop for said cover upon the swinging of the same to open position.

2. In a milk bottle container of the class described: a compartment bearing member; knuckle bearing bosses projecting rearwardly from said member; a cover swingably mounted between said knuckles; a pintle projected through aligned passages in said bosses for securing said cover in position; and removable plugs inserted in the outer ends of said passages for preventing removal of said pintle.

3. In a milk bottle container of the class described: a boss projecting rearwardly therefrom and provided with a vertically extending slot communicating with a hollowed-out space formed in said boss, said slot being adapted for the reception of a supporting member; a locking bar projecting through said boss and extending through said compartment for locking the supporting member in said compartment; and an angularly turned tongue on said locking bar for preventing removal of said locking bar from locking position.

In testimony whereof I have signed the foregoing specification.

LEONARD HINKLEY.